(12) United States Patent
Roberts et al.

(10) Patent No.: US 10,774,648 B2
(45) Date of Patent: Sep. 15, 2020

(54) METHODS AND FEATURES FOR CMC COMPONENT REPAIRS

(71) Applicant: General Electric Company, Schenectady, NY (US)

(72) Inventors: Herbert Chidsey Roberts, Middletown, OH (US); Glenn Curtis Taxacher, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 427 days.

(21) Appl. No.: 15/284,602

(22) Filed: Oct. 4, 2016

(65) Prior Publication Data

US 2018/0094525 A1 Apr. 5, 2018

(51) Int. Cl.
*F01D 5/00* (2006.01)
*F04D 29/32* (2006.01)
(Continued)

(52) U.S. Cl.
CPC .......... *F01D 5/005* (2013.01); *F04D 29/324* (2013.01); *F04D 29/542* (2013.01); *F01D 5/282* (2013.01);
(Continued)

(58) Field of Classification Search
CPC ...... F23R 3/007; Y10T 428/30; Y10T 50/672; Y10T 50/673; Y10T 29/49318; Y10T 29/49372; Y10T 156/10; Y10T 428/1471; Y10T 428/2828; F01D 5/005; F01D 5/282; F01D 5/28; F01D 5/147; F01D 5/284; F05D 2300/6033; F05D 2220/32; F05D 2230/80; F05D 2300/6034; F05D 2300/80; F04D 29/324; F04D 29/32; F04D 29/02; F04D 29/54; Y02T 50/67; B05D 5/00; C04B 2235/5244; C04B 2235/5268; C04B 35/71; C04B 35/589; C04B 35/563; C04B 35/565; C04B 35/117; C04B 35/803; C04B 35/806; C04B 2237/365; C04B 2237/32; C04B 35/80; C04B 14/4693; Y02P 70/253; Y02E 10/721; B28B 11/00; B23P 6/00;
(Continued)

(56) References Cited

U.S. PATENT DOCUMENTS

4,428,992 A  1/1984 Street
5,601,676 A  2/1997 Zimmerman et al.
(Continued)

*Primary Examiner* — Camie S Thompson
(74) *Attorney, Agent, or Firm* — Dority & Manning, P.A.

(57) ABSTRACT

Methods and features for repairing CMC components are provided. Methods include positioning a plurality of CMC plies at a damaged area of a CMC component and densifying the component and plies. For example, each ply may be a unidirectional ply positioned at the damaged area such that the plurality of plies is oriented in a plurality of directions. As another example, each ply may define a ply direction and comprise a plurality of ceramic fibers substantially extending along the ply direction, and the ply directions of at least two plies may be differently oriented. A repair patch for a CMC component also is provided that comprises a plurality of CMC plies. Fibers forming a first ply extend substantially along a first ply direction and fibers forming a second ply extend substantially along a second ply direction. The first and second plies of the repair patch are oriented in different directions.

6 Claims, 9 Drawing Sheets

(51) Int. Cl.
*F04D 29/54* (2006.01)
*F01D 5/28* (2006.01)
*F02D 29/02* (2006.01)
*F04D 29/02* (2006.01)

(52) U.S. Cl.
CPC ........ *F04D 29/023* (2013.01); *F05D 2220/32* (2013.01); *F05D 2230/80* (2013.01); *F05D 2300/6033* (2013.01); *F05D 2300/6034* (2013.01); *Y02T 50/672* (2013.01); *Y02T 50/673* (2013.01)

(58) Field of Classification Search
CPC . C23C 16/4584; B32B 18/00; B32B 2250/03; B32B 2260/03; B32B 2262/105; B32B 2556/00; B32B 7/03; B29C 73/10; B29C 65/488; B29C 65/4885
USPC ........... 428/408, 446, 292.1, 698; 29/889.11, 29/402.09, 402.11; 156/60, 290; 427/140; 252/573; 425/11; 416/223 R, 416/241 B; 501/95.2
See application file for complete search history.

(56) References Cited

U.S. PATENT DOCUMENTS

| | | | |
|---|---|---|---|
| 5,620,768 | A | 4/1997 | Hoffmann, Sr. |
| 5,714,208 | A | 2/1998 | Ferrell et al. |
| 5,928,448 | A | 7/1999 | Daws |
| 6,149,749 | A | 11/2000 | McBroom |
| 6,890,660 | B2* | 5/2005 | Beyer ............... F23M 5/00 123/193.5 |
| 7,927,077 | B2 | 4/2011 | Olson |
| 7,935,205 | B2 | 5/2011 | Bogue et al. |
| 8,545,650 | B2 | 10/2013 | Evens et al. |
| 8,826,534 | B2 | 9/2014 | Cappelli et al. |
| 2006/0125156 | A1 | 6/2006 | Woolhouse |
| 2011/0003077 | A1 | 1/2011 | Heng et al. |
| 2014/0099484 | A1 | 4/2014 | Roberts, III et al. |
| 2014/0200130 | A1* | 7/2014 | Szweda ............ C04B 35/117 501/95.2 |
| 2014/0241900 | A1 | 8/2014 | Roberts, III et al. |
| 2014/0315029 | A1* | 10/2014 | Roberts, III ........ B05D 5/005 428/446 |
| 2015/0090392 | A1 | 4/2015 | Bertrand et al. |

* cited by examiner

METHODS AND FEATURES FOR CMC COMPONENT REPAIRS

FIELD OF THE INVENTION

The present subject matter relates generally to ceramic matrix composite components. More particularly, the present subject matter relates to methods and features for repairing ceramic matrix composite components.

BACKGROUND OF THE INVENTION

Ceramic matrix composite (CMC) materials are more commonly being used for various high temperature applications. For example, because CMC materials can withstand relatively extreme temperatures, there is particular interest in replacing components within a combustion gas flow path of a gas turbine engine with components made from CMC materials. Typically, CMC materials comprise ceramic fibers embedded in a matrix material such as silicon carbide (SiC), silicon, silica, alumina, or combinations thereof. Plies of the CMC material may be laid up to form a preform component that may then undergo thermal processing, such as a cure or burn-out to yield a high char residue in the preform, and subsequent chemical processing, such as melt-infiltration with silicon, to arrive at a component formed of a CMC material having a desired chemical composition.

Damaged CMC components can be difficult to repair. For example, typical CMC repairs utilize repair plugs made from a stack of CMC plies, and for small CMC parts requiring small repair plugs, it may be difficult to stack plies to form a small repair plug. Further, the ceramic fibers within the repair plug may not optimally align with the stress orientation of the CMC component, particularly in a CMC component operating in a multidirectional load path environment, where the local stress state at the area to be repaired varies from the global stresses for which the component's architecture was designed. As such, the repair plug may not be able to control stresses along one or more load paths. Moreover, some CMC materials may not be suitable for all methods of processing a CMC repair patch with the CMC component. As an example, some processes for densifying CMC materials such as melt infiltration require temperatures that would attack, degrade, or essentially burn up individual CMC fibers such that using individual randomly oriented CMC fibers may be unfeasible. As another example, melt infiltration may produce voids in the intertow regions of CMC materials utilizing woven fibers rather than substantially unidirectional fibers, such that the use of such woven fiber CMC repair patches may be undesirable.

Accordingly, CMC repair patches and methods for repairing CMC components that overcome one or more shortcomings of typical repairs would be desirable. For example, a repair patch utilizing unidirectional CMC plies that provides more alignment options for repairing a CMC component operating in a multidirectional load path environment would be beneficial. In particular, a repair patch utilizing randomly oriented unidirectional CMC plies would be useful. Additionally, a repair patch utilizing unidirectional CMC plies in which the CMC plies are oriented such that ceramic fibers of the plies extend in a plurality of directions would be helpful. Further, methods for repairing CMC components utilizing randomly oriented unidirectional CMC plies would be advantageous.

BRIEF DESCRIPTION OF THE INVENTION

Aspects and advantages of the invention will be set forth in part in the following description, or may be obvious from the description, or may be learned through practice of the invention.

In one exemplary embodiment of the present disclosure, a method for repairing a ceramic matrix composite (CMC) component is provided. The method includes positioning a plurality of CMC plies at a damaged area of the CMC component and densifying the CMC component and CMC plies. Each ply of the plurality of CMC plies is a unidirectional CMC ply. The plurality of unidirectional CMC plies are positioned at the damaged area of the CMC component such that the plurality of unidirectional CMC plies are oriented in a plurality of directions.

In another exemplary embodiment of the present disclosure, a method for repairing a CMC component is provided. The method includes positioning a plurality of CMC plies at a damaged area of the CMC component and densifying the CMC component and CMC plies. Each ply of the plurality of CMC plies defines a ply direction and comprises a plurality of ceramic fibers substantially extending along a single direction. The single direction is the ply direction, and the ply direction of a first ply of the plurality of CMC plies is oriented differently with respect to the CMC component from the ply direction of a second ply of the plurality of CMC plies.

In a further exemplary embodiment of the present disclosure, a repair patch for a CMC component is provided. The repair patch comprises a plurality of CMC plies. The plurality of CMC plies includes a first CMC ply defining a first ply direction and a second CMC ply defining a second ply direction. Fibers forming the first ply extend substantially along the first ply direction and fibers forming the second ply extend substantially along the second ply direction. The first ply and the second ply are oriented such that the first ply direction extends in a different direction than the second ply direction with respect to the CMC component.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first," "second," and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows and "downstream" refers to the direction to which the fluid flows.

Figure 1:
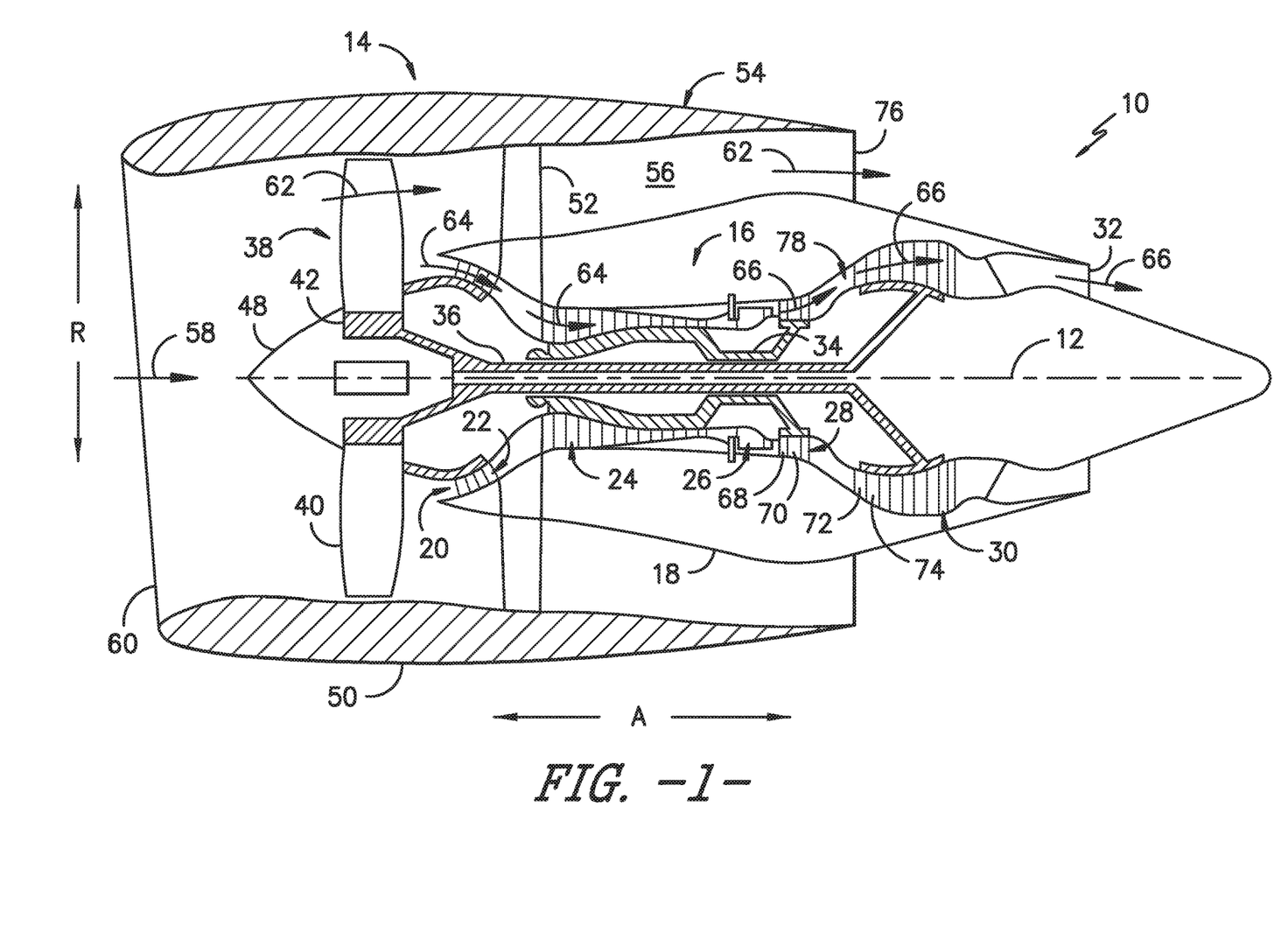
FIG. 1 provides a schematic cross-section view of an exemplary gas turbine engine according to various embodiments of the present subject matter.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference) and a radial direction R. In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22.

For the depicted embodiment, fan section 14 includes a fan 38 having a plurality of fan blades 40 coupled to a disk 42 in a spaced apart manner. As depicted, fan blades 40 extend outward from disk 42 generally along the radial direction R. The fan blades 40 and disk 42 are together rotatable about the longitudinal axis 12 by LP shaft 36. In some embodiments, a power gear box having a plurality of gears may be included for stepping down the rotational speed of the LP shaft 36 to a more efficient rotational fan speed.

Referring still to the exemplary embodiment of FIG. 1, disk 42 is covered by rotatable front nacelle 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that nacelle 50 may be configured to be supported relative to the core turbine engine 16 by a plurality of circumferentially-spaced outlet guide vanes 52. Moreover, a downstream section 54 of the nacelle 50 may extend over an outer portion of the core turbine engine 16 so as to define a bypass airflow passage 56 therebetween.

During operation of the turbofan engine 10, a volume of air 58 enters turbofan 10 through an associated inlet 60 of the nacelle 50 and/or fan section 14. As the volume of air 58 passes across fan blades 40, a first portion of the air 58 as indicated by arrows 62 is directed or routed into the bypass airflow passage 56 and a second portion of the air 58 as indicated by arrows 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

In some embodiments, components of turbofan engine 10, particularly components within hot gas path 78, such as components of combustion section 26, HP turbine 28, or LP turbine 30, may comprise a ceramic matrix composite (CMC) material, which is a non-metallic material having high temperature capability. Exemplary CMC materials utilized for such components may include silicon carbide (SiC), silicon, silica, or alumina matrix materials and combinations thereof. Ceramic fibers may be embedded within the matrix, such as monofilaments like sapphire (e.g., Saphikon's Saphikon) and silicon carbide (e.g., Textron's SCS-6), as well as rovings and yarn including silicon carbide (e.g., Nippon Carbon's NICALON®, Ube Industries' TYRANNO®, and Dow Corning's SYLRAMIC®), alumina silicates (e.g., 3M's Nextel 440,480, and 720), alumina (3M's Nextel 610) and chopped whiskers and fibers (e.g., Nextel's 440 and SAFFIL®), and optionally ceramic particles (e.g., oxides of Si, Al, Zr, Y, and combinations thereof) and inorganic fillers (e.g., pyrophyllite, wollastonite, mica, talc, kyanite, and montmorillonite). For example, in certain embodiments, bundles of the fibers, which may include a ceramic refractory material coating, are formed as a reinforced tape, such as a unidirectional reinforced tape. A plurality of the tapes may be laid up together (e.g., as plies) to form a preform component. The bundles of fibers may be impregnated with a slurry composition prior to forming the preform or after formation of the preform. The preform may then undergo thermal processing, such as a cure or burn-out to yield a high char residue in the preform, and subsequent chemical processing, such as melt-infiltration with silicon, to arrive at a component formed of a CMC material having a desired chemical composition. In other embodiments, the preform material may be formed by, e.g., a woven cloth rather than by a tape. In other embodiments, the CMC material may be formed by chemical vapor infiltration (CVI), polymer infiltration and pyrolysis (PIP), or a combination of densification techniques, e.g., PIP plus CVI.

As stated, components comprising a CMC material may be used within the hot gas path 78, such as within the combustion and/or turbine sections of engine 10. As an example, one or more stages of turbine rotor blades and/or turbine nozzles may be CMC components formed from CMC materials. However, CMC components may be used in other sections as well, such as the compressor and/or fan sections.

One or more CMC components may experience localized damage during the life of the component. For example, a CMC turbine blade may be damaged in service if a tip or cap of the blade comes into contact with a gas turbine shroud. The CMC component also could be damaged by foreign objects, e.g., a foreign object impinging one or more components of the hot gas path. Further, initial damage to a CMC component may lead to secondary damage if the CMC or ceramic fibers are exposed to moisture or other contaminates, e.g., in the combustion gases 66 within the hot gas path 78, which can cause recession of the CMC.

Figure 2:
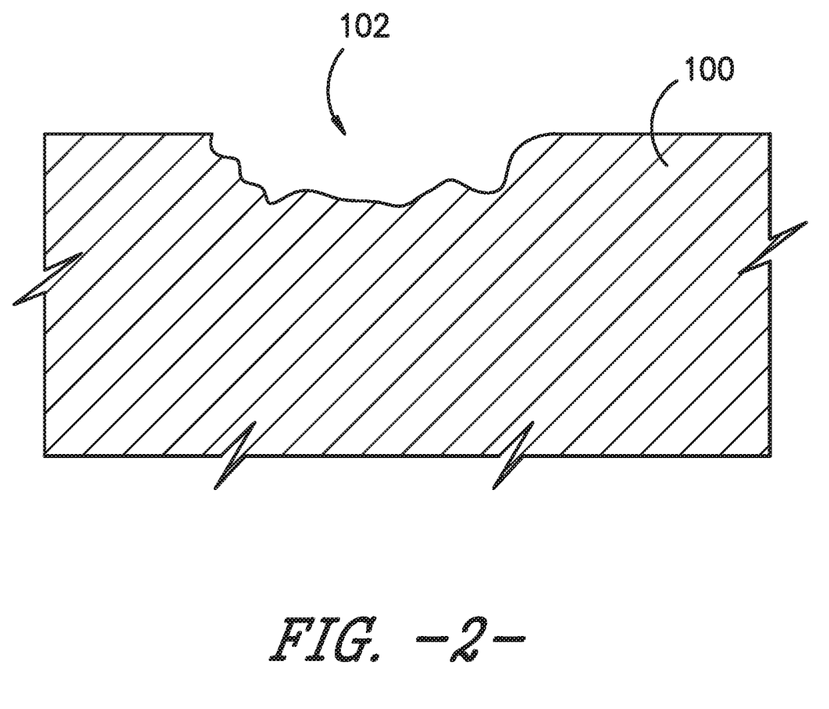
FIG. 2 provides a schematic cross-section view of a damaged area in a portion of a CMC component.

FIG. 2 illustrates a schematic cross-section view of a portion of a CMC component 100 having a damaged area 102. The damaged area 102 may be, e.g., a cavity resulting from impingement by a foreign object, inadvertent contact between the CMC component 100 and an adjacent turbine component, or any other source of damage to the component 100. As used herein, the term "cavity" refers to any hollow space within the CMC component 100, such as an opening, crack, gap, aperture, hole, etc. Such a cavity or damaged area 102 can be formed on the CMC component 100 through normal use and generally represents an area where fragments of the original CMC material have been chipped off of the CMC component 100.

To repair the damaged area 102, the damaged area first may be scarfed, e.g., to clean matrix material and ceramic fibers from the damaged area and/or to otherwise prepare the area to receive CMC repair material. In some embodiments, the damaged area is scarfed by machining about the cavity 102 at a specific angle or to achieve a target aspect ratio, such as a width to depth ratio of 4:1, for the damaged area. In other embodiments, the damaged area 102 is scarfed by removing ceramic fibers protruding from or into the cavity and/or by removing loose matrix material from the cavity, but otherwise not enlarging the damaged area. In appropriate embodiments, the damaged area 102 may not require scarfing, such that scarfing is omitted or skipped.

Figure 3A:
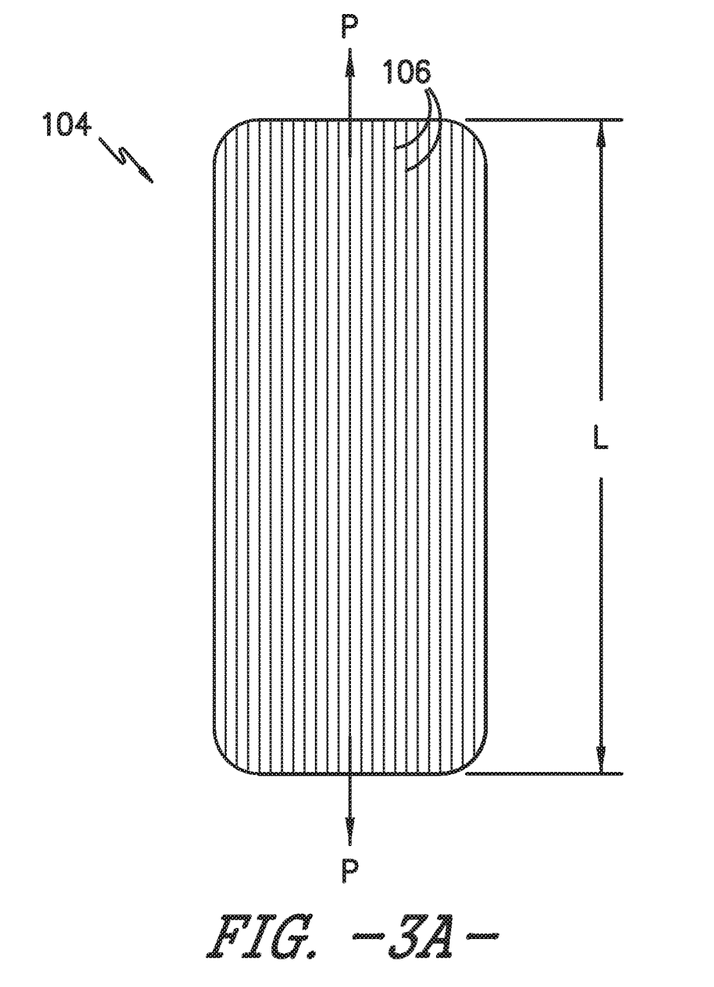
FIG. 3A provides a schematic view of a unidirectional CMC ply according to an exemplary embodiment of the present subject matter.
Figure 3B:
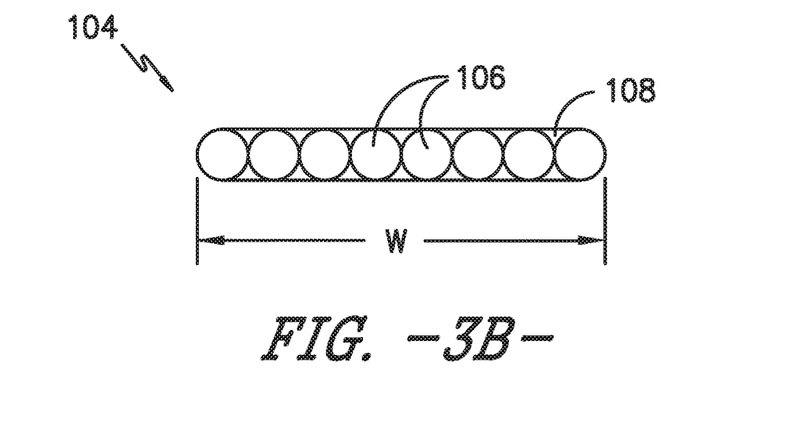
FIG. 3B provides a cross-section view of the exemplary unidirectional ply of FIG. 3A.

After preparing the damaged area 102, CMC repair material such as a CMC repair patch comprising one or more CMC plies may be positioned at the damaged area. FIG. 3A provides a schematic view of a CMC ply 104 having substantially unidirectional ceramic fiber tows 106, and FIG. 3B provides a schematic cross-section view of the CMC ply 104 with tows 106 embedded in matrix material 108. More particularly, the CMC ply 104 defines a ply direction P, and substantially all of the tows 106 of CMC ply 104 extending along the ply direction P such that the ply is a unidirectional CMC ply 104. That is, substantially all of the ceramic fiber tows 106 of CMC ply 104 extend along a single direction, e.g., the ply direction P as in the illustrated embodiment of FIG. 3A, such that the fibers are unidirectional and the ply may be referred to as a unidirectional CMC ply 104.

Figure 4:
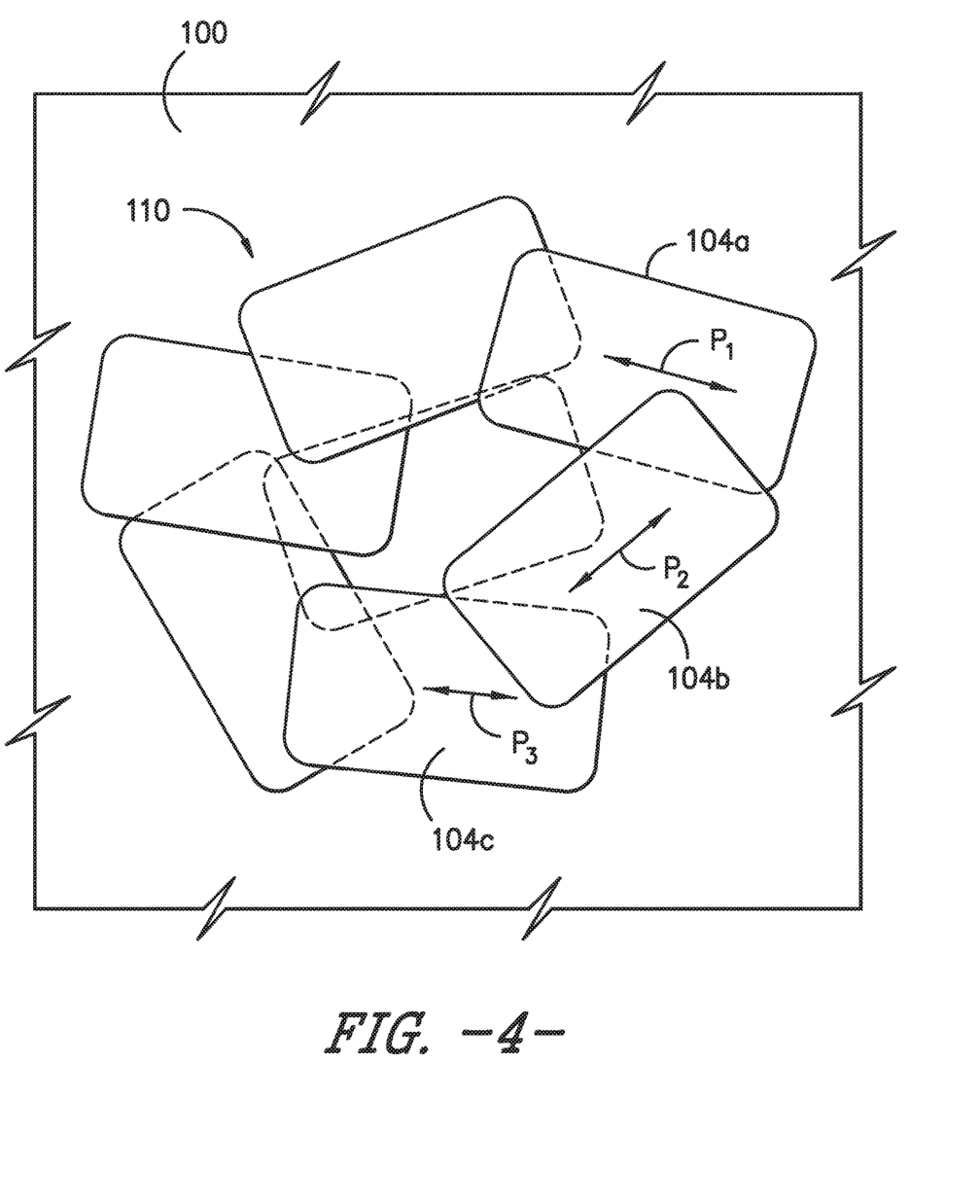
FIG. 4 provides a schematic view of a CMC repair patch positioned at the damaged area of the CMC component shown in FIG. 2, according to an exemplary embodiment of the present subject matter.
Figure 5:
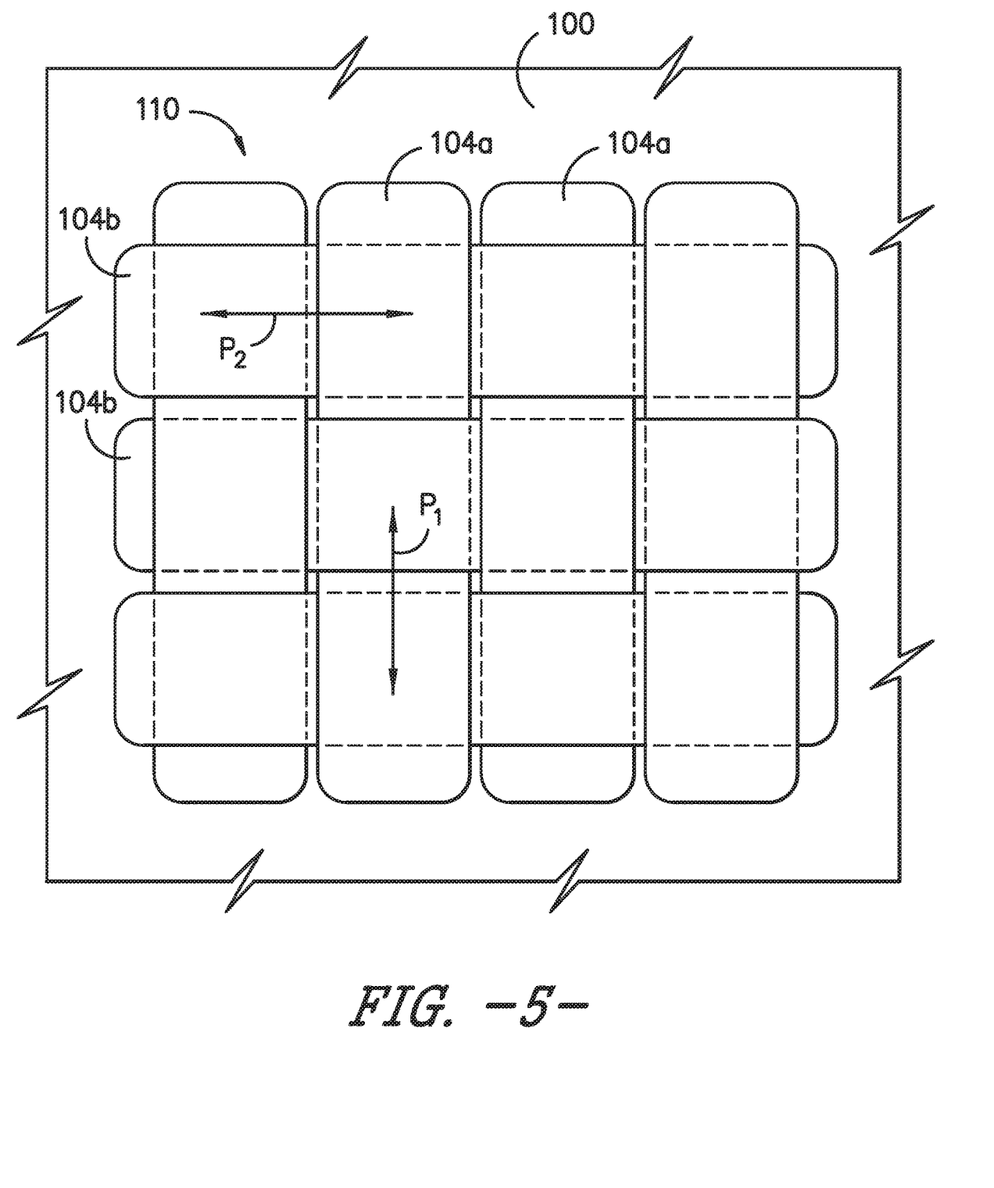
FIG. 5 provides a schematic view of a CMC repair patch positioned at the damaged area of the CMC component shown in FIG. 2, according to another exemplary embodiment of the present subject matter.
Figure 6:
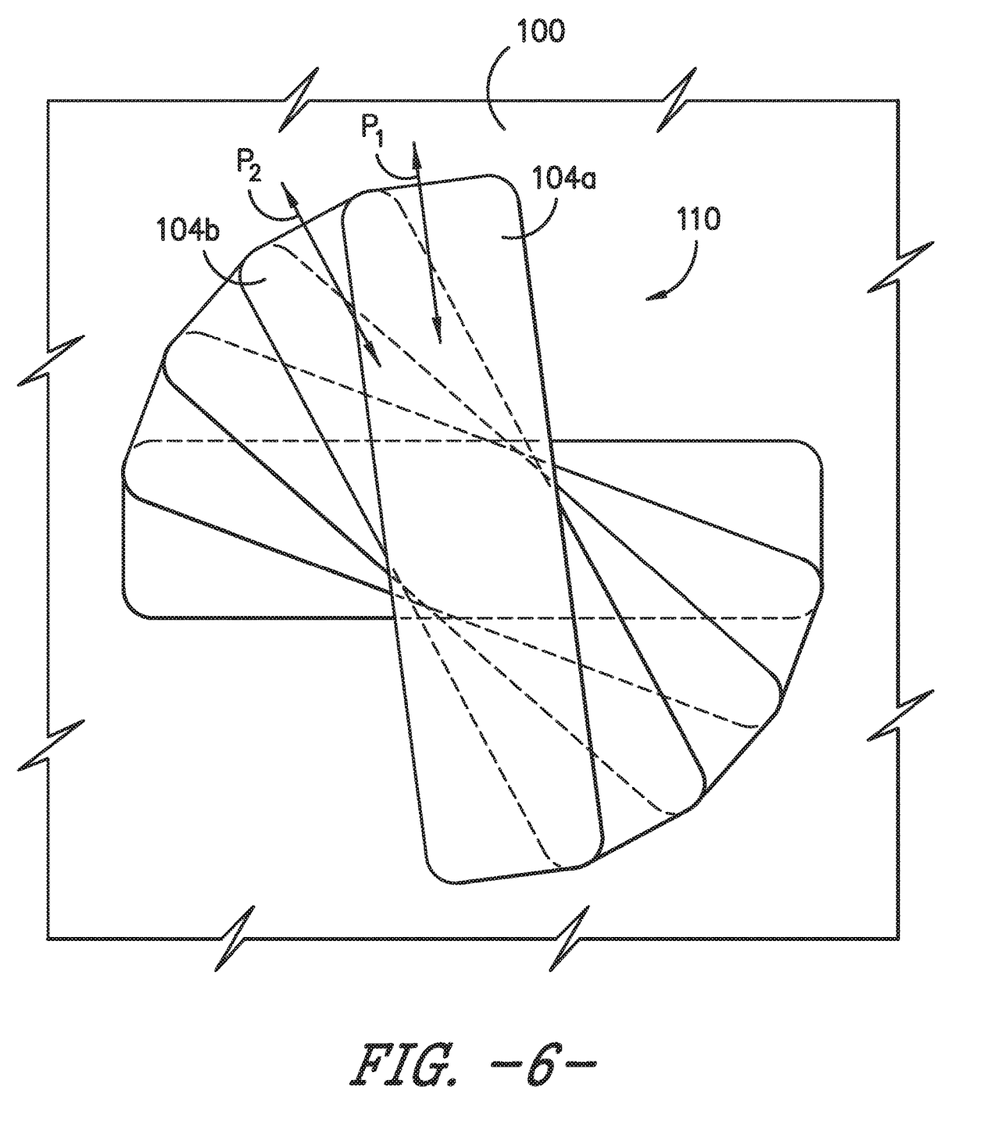
FIG. 6 provides a schematic view of a CMC repair patch positioned at the damaged area of the CMC component shown in FIG. 2, according to another exemplary embodiment of the present subject matter.

As shown in FIGS. 4 through 6, a plurality of unidirectional CMC plies 104 may be positioned at the damaged area 102 of a CMC component 100 to form a repair patch 110. Accordingly, prior to positioning the plies 104 at the damaged area 102, the plurality of plies 104 is formed from a CMC material. As described above, the CMC plies 104 may be formed from a tape comprising ceramic fiber tows 106 embedded in matrix material 108. In an exemplary embodiment, the CMC plies 104 are formed from or comprise scraps or remnants of CMC material, such as pieces or sections of tape left over from forming one or more CMC components. Thus, large sheets of CMC material are not required to form the repair patch 110, but rather, the repair patch 110 may utilize pieces of CMC material that otherwise would be scrapped or wasted. Of course, in other embodiments, the repair patch 110 could be formed from a plurality of CMC plies 104 specifically fabricated for the purpose of repairing CMC components instead of from scrap CMC materials.

In an exemplary embodiment, each ply 104 has a width W of at least three ceramic fiber tows 106 and a length L that is about four times the width to about 20 times the width of the ply. That is, each CMC ply 104 has a ratio of ply length L to ply width W within a range of about 4:1 to about 20:1. In some embodiments, the ratio of ply length L to ply width W may be within a range of about 6:1 to about 10:1. Further, the ply width W should be selected to minimize degradation of the ceramic fibers of the CMC ply 104 during densification of the repair patch 110 with the CMC component 100 as described in greater detail below. More particularly, densification processes such as melt infiltration or the like may require temperatures that can attack, degrade, or essentially burn up individual CMC fibers, and therefore, may negatively impact the edges of the CMC ply. Accordingly, each CMC ply 104 should have a sufficient width W to maintain its integrity despite harsh densification conditions. A ply width W of at least three tows 106 should be sufficient, e.g., a ply width W of three, four, five, six, or more tows, such as the ply width W of eight tows illustrated in FIG. 3B, but other ply widths may be used as well. Moreover, although the exemplary embodiment illustrated in FIGS. 3A and 3B has a generally rectangular shape and cross-section, the plies 104 need not be rectangular in shape, and each ply 104 need not have the same shape. For example, some plies 104 may be generally triangular in shape, some plies 104 may be generally trapezoidal in shape, etc. Additionally or alternatively, some plies 104 may have an irregular shape, e.g., a shape that may not be described as triangular, rectangular, trapezoidal, or the like.

Turning now to FIG. 4, a CMC repair patch 110 is illustrated according to an exemplary embodiment of the present subject matter. In the exemplary embodiment of FIG. 4, each ply of a plurality of unidirectional CMC plies 104 is randomly oriented with respect to the CMC component 100. That is, the ply direction P of one ply 104 is oriented differently with respect to the CMC component 100 than the ply direction P of an adjacent ply 104. More particularly, the repair patch 110 shown in FIG. 4 is formed from a plurality of randomly oriented unidirectional CMC plies 104. As such, each unidirectional CMC ply 104 can be in any orientation with respect to CMC component 100, e.g., one CMC ply 104 may be oriented along the 0° direction or the axis of the component, another CMC ply 104 may be oriented along the 90° direction or hoop direction of the component, and other CMC plies 104 may be off-axis with respect to the CMC component 100, such as 17°, 25°, 59°, 105°, etc. off-axis or any other off-axis orientation. However, in some embodiments, no CMC plies 104 of repair patch 110 are oriented along the axial and/or hoop directions of the CMC component 100. Further, when the unidirectional CMC plies 104 are randomly oriented to form repair patch 110, no two CMC plies 104 need have the same orientation, although two or more plies may have the same orientation while other plies have different orientations.

As shown in FIG. 4, the plurality of unidirectional CMC plies 104 includes a first unidirectional CMC ply 104a, a second unidirectional CMC ply 104b, and a third unidirectional CMC ply 104c. The first unidirectional CMC ply 104a defines a first ply direction $P_1$, the second unidirectional CMC ply 104b defines a second ply direction $P_2$, and the third unidirectional CMC ply 104c defines a third ply direction $P_3$. The first, second, and third unidirectional CMC plies 104a, 104b, 104c are positioned adjacent to one another at the damaged area 102 of CMC component 100. Further, the first, second, and third unidirectional CMC plies 104a, 104b, 104c are positioned such that the plies are randomly oriented with respect to the CMC component 100 and each ply direction $P_1$, $P_2$, $P_3$ is oriented differently with respect to the CMC component 100. As such, the fibers of the plies 104a, 104b, 104c positioned at the damaged area 102 are oriented differently from one ply to the next such that the repair patch comprises fibers extending in a plurality of directions. As depicted in FIG. 4, more than three unidirectional CMC plies 104 may be used to form repair patch 110, and each ply 104 of the plurality of plies 104 may have a ply direction P that extends in a different direction from the other ply directions P when the plurality of plies 104 is positioned at the damaged area 102 of the CMC component 100. However, it will be appreciated that any suitable number of plies 104 may be used to form repair patch 110.

By extending in a plurality of directions, the ceramic fibers of the CMC repair patch 110 may help impart strength to the repaired section of the CMC component 100. More particularly, orienting the ceramic fibers in a plurality of directions may help control and/or avoid residual stresses in the CMC component 100 that could weaken the repaired area, as well as localized or surface stresses developed during engine use. Therefore, the randomly oriented plies 104 of repair patch 110 may be particularly useful for CMC components 100 subject to multidirectional loads.

Referring now to FIG. 5, a CMC repair patch 110 is illustrated according to another exemplary embodiment of the present subject matter. In the exemplary embodiment of FIG. 5, the plurality of unidirectional CMC plies 104 are interwoven with one another. That is, a plurality of first unidirectional CMC plies 104a may be interwoven with a plurality of second unidirectional CMC plies 104b. Each ply of the plurality of first unidirectional CMC plies 104a may have a first ply direction $P_1$, and each ply of the plurality of second unidirectional CMC plies 104b may have a second ply direction $P_2$. The plurality of plies 104 may be interwoven such that each first unidirectional CMC ply 104a is positioned with its ply direction $P_1$ extending parallel to the ply direction of the other first unidirectional CMC plies 104a, each second unidirectional CMC ply 104b is positioned with its ply direction $P_2$ extending parallel to the ply direction of the other second unidirectional CMC plies 104b, and the first ply direction $P_1$ is perpendicular to the second ply direction $P_2$. Each first unidirectional CMC ply 104a is alternately passed under and over each second unidirectional CMC ply 104b to interweave the first and second plies 104a, 104b.

In some embodiments, a single layer of interwoven first and second unidirectional CMC plies 104a, 104b may be used to form repair patch 110. In other embodiments, two or more layers of interwoven first and second plies 104a, 104b may be used to form repair patch 110. In such embodiments, the ply directions P of one layer of first and second plies 104a, 104b may be offset from the ply directions P of another layer of first and second plies 104a, 104b such that the ceramic fibers of the CMC repair patch 110 extend along several directions with respect to the CMC component 100. Notably, in embodiments utilizing only a single layer of first and second unidirectional CMC plies 104a, 104b, the fibers of repair patch 110 extend along substantially along two directions. As previously stated, having the ceramic fibers of the CMC repair patch 110 extend in more than one direction may help impart multidirectional strength to the repaired section of the CMC component 100. That is, orienting the ceramic fibers in a plurality of directions may help control and/or avoid concentration of stresses in one axis in the CMC component 100 that could weaken the repaired area and may be particularly useful for CMC components 100 operating under multidirectional loads.

FIG. 6 provides a schematic view of a CMC repair patch 110 according to another exemplary embodiment of the present subject matter. In the exemplary embodiment of FIG. 6, the plurality of unidirectional CMC plies 104 are oriented in a generally fan-shaped configuration. More specifically, adjacent unidirectional CMC plies 104 are offset from one another along a generally arcuate path. As such, the ply direction P of one ply 104 is oriented differently with respect to the CMC component 100 than the ply direction P of an adjacent ply 104. For example, the plurality of unidirectional CMC plies 104 forming the repair patch 110 includes a first unidirectional CMC ply 104a, a second unidirectional CMC ply 104b, and a third unidirectional CMC ply 104c. The first unidirectional CMC ply 104a defines a first ply direction $P_1$, the second unidirectional CMC ply 104b defines a second ply direction $P_2$, and the third unidirectional CMC ply 104c defines a third ply direction $P_3$. The first, second, and third unidirectional CMC plies 104a, 104b, 104c are positioned adjacent to one another at the damaged area 102 of CMC component 100. Further, the first, second, and third unidirectional CMC plies 104a, 104b, 104c are positioned such that the plies are offset from one another along a generally arcuate path in a generally fan-shaped configuration. Moreover, each ply direction $P_1$, $P_2$, $P_3$ is oriented differently with respect to the CMC component 100, and accordingly, the fibers of the plies 104a, 104*b*, 104*c* positioned at the damaged area 102 are oriented differently from one another such that the fibers of the depicted repair patch 110 extend in a plurality of directions. As described with respect to FIGS. 4 and 5, orienting the ceramic fibers of the CMC repair patch 110 as shown in FIG. 6 may help impart strength to the repaired section of the CMC component 100, e.g., by helping to control and/or avoid residual stresses in the CMC component 100 that could weaken the repaired area. As such, the exemplary CMC repair patches 110 depicted in FIGS. 4, 5, and 6 may be particularly useful for CMC components 100 subject to multidirectional loads.

Thus, in various embodiments, repairing a CMC component such as the CMC component 100 may include positioning a plurality of unidirectional CMC plies 104 at a damaged area 102 of the CMC component 100. The unidirectional CMC plies 104 are oriented in a plurality of directions with respect to the CMC component 100. In exemplary embodiments, each unidirectional CMC ply 104 overlaps at least one other unidirectional CMC ply 104 and is oriented in a different direction from the at least one other unidirectional CMC ply 104. More particularly, the ply direction P of one ply 104 of the plurality of CMC plies may be oriented differently with respect to the CMC component 100 from the ply direction P of an adjacent ply 104 of the plurality of CMC plies. The CMC plies may be randomly positioned at the damaged area, e.g., the plies may be entirely randomly positioned as shown in FIG. 4 or more purposefully positioned as shown in FIGS. 5 and 6.

FIGS. 4, 5, and 6 generally illustrate a repair patch 110 comprising a plurality of unidirectional plies 104 positioned on a body of a CMC component 100, such as on an outer surface of an airfoil of a gas turbine engine nozzle. However, the repair patch 110 described also may utilized for damage that occurs in or near areas of CMC components or transitions between CMC components that have a bend, curvature, and/or an angle between the components. By utilizing a plurality of CMC plies 104 where each ply 104 has a relatively low aspect ratio, the repair patch 110 may seat better in the area of curvature or angle than, e.g., plies having high aspect ratios, and may provide a better bond between the new material of the patch 110 and the old material of the component(s) 100. Further, by utilizing a plurality of plies 104, the repair patch 110 may be able to better match complex geometry or surface contours of a component 100 or a transition area between components 100. More particularly, repair patches 110 comprising a plurality of plies 104 may generally conform to complex geometry or surface contours of a component 100 without requiring tooling to urge the repair patch to conform to the component's shape. Accordingly, by using repair patches 110 as described herein, CMC component repairs may be made without requiring tooling shaped to match each contour of the component or transition regions between components.

Figure 7A:
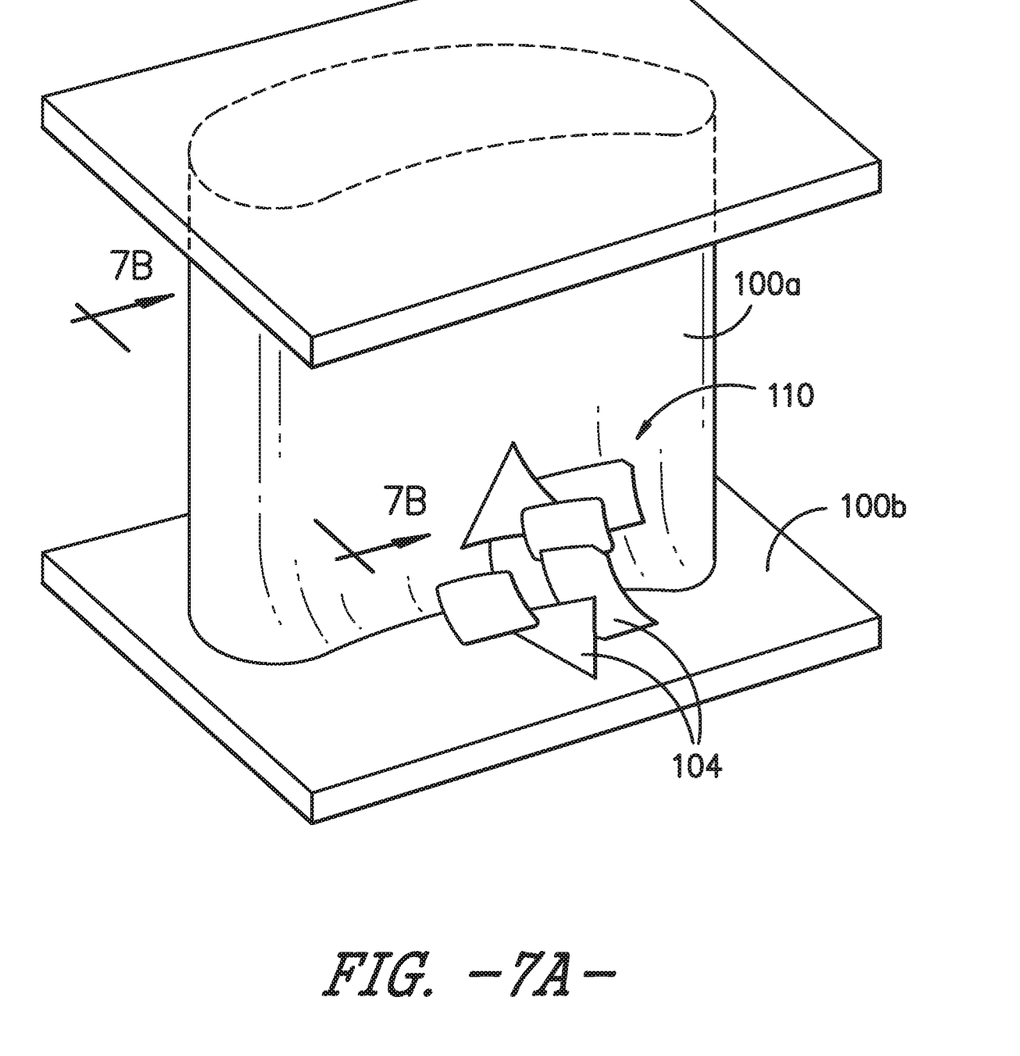
FIG. 7A provides a perspective view of a CMC repair patch positioned at an airfoil to inner band transition region of a gas turbine engine nozzle, according to an exemplary embodiment of the present subject matter.
Figure 7B:
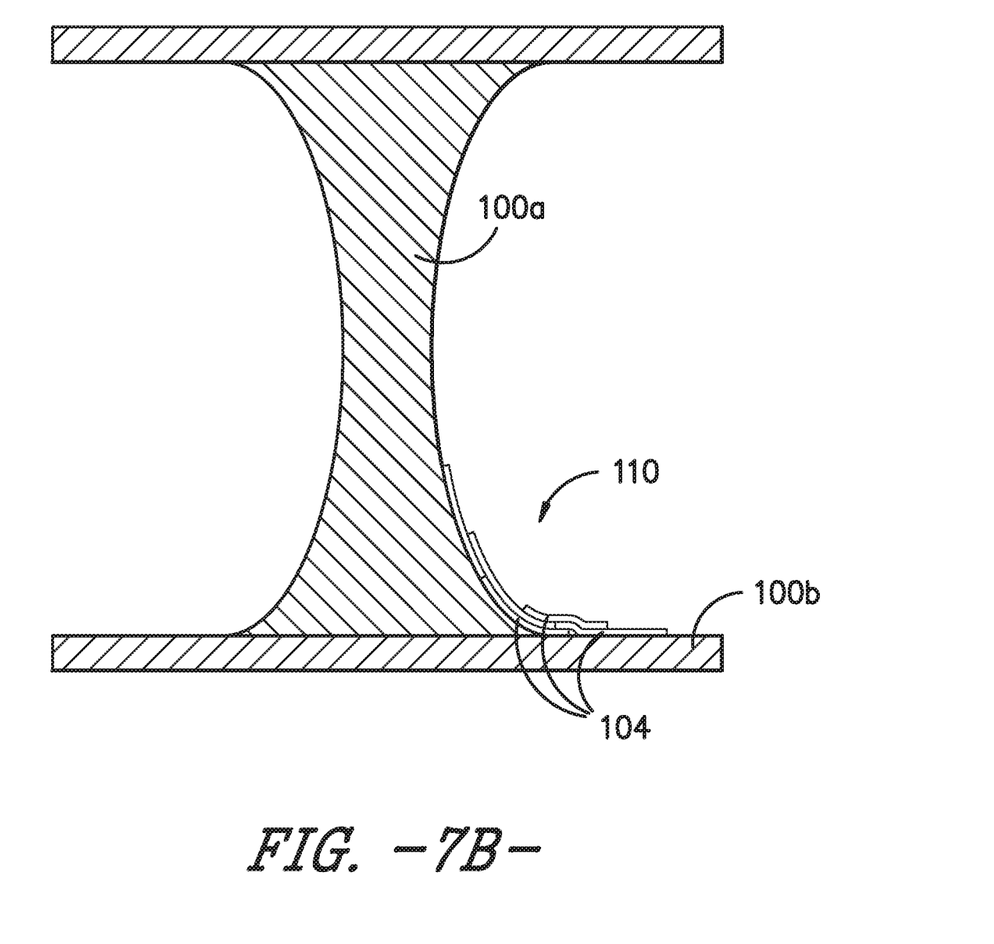
FIG. 7B provides a cross-section view of the nozzle of FIG. 7A.

FIGS. 7A and 7B depict a repair patch 110 applied to an airfoil to inner band transition region 112 of a gas turbine engine nozzle. As illustrated, the transition region 112 has a radius of curvature, i.e., the transition region 112 is not generally flat or planar. A plurality of unidirectional CMC plies 104, forming a repair patch 110, is positioned over a damaged area 102 in or near the transition region 112. The plies 104 may be positioned at damaged area 102 such that the plies 104 are oriented in a plurality of direction, e.g., as described and depicted with respect to FIGS. 4, 5, and 6, where the plies 104 are randomly oriented, interwoven, or offset from one another in a fan-shaped configuration, respectively. As depicted in the exemplary embodiment, the plurality of CMC plies 104 generally conforms to the curvature of the transition region 112 such that the repair patch 110, comprising the plurality of plies 104, substantially seats within transition region 112. Further, when the repair patch 110 is processed with the CMC components 100, i.e., airfoil 100*a* and inner band 100*b*, as described in greater detail below, the CMC material of the repair patch 110 mechanically bonds with the CMC material of the components 100, thereby integrating with the original CMC material of components 100 and repairing the damaged area 102.

To better fit within the transition region 112, or other areas of CMC components 100 having complex geometry, the aspect ratio of the CMC plies 104 may be smaller than the aspect ratios described above. For instance, the ratio of the ply length L to the ply width W of plies 104 used in embodiments similar to the exemplary embodiment of FIGS. 7A and 7B may be in a range of about 1:1 to about 3:1. Such smaller aspect ratio plies 104 may be particularly suitable for use in transition regions having about a 15° or greater transition between the components. However, plies 104 having other aspect ratios also may be suitable for use in such embodiments. Further, as described with respect to FIGS. 3A and 3B, the plies 104 need not be generally rectangular in shape but may have any suitable shape, such as triangular, trapezoidal, etc., including irregular shapes. Moreover, as previously described, the plies 104 for repair patch 110 as shown in FIGS. 7A and 7B may be made from leftover pieces or remnants of CMC plies used to form other parts or components, thereby optimizing material usage and minimizing waste.

It will be appreciated that, although some continuity is lost by utilizing repair patch 110 made from a plurality of plies 104, any load on the repaired component 100 is transferred through a plurality of shear points such that the load path is broken up into several portions. Random orientation of the plies 104 forming repair patch 110, whether completely random or "purposefully" random, e.g., as illustrated in FIGS. 5 and 6, allows the load path to readjust if one portion fails. For instance, if one ply 104 can no longer bear its share of the load, the load may be redistributed to the other plies 104. In contrast, if a ply in a single piece or single load path repair can no longer bear the load, the load cannot be redistributed and the repair may fail. Accordingly, the random or diversified orientation of the plies 104 in the repair patches 110 described herein lessen the demand on linear continuity in the repair patch, which can increase the effectiveness and/or reliability of the repair patch.

Figure 8:
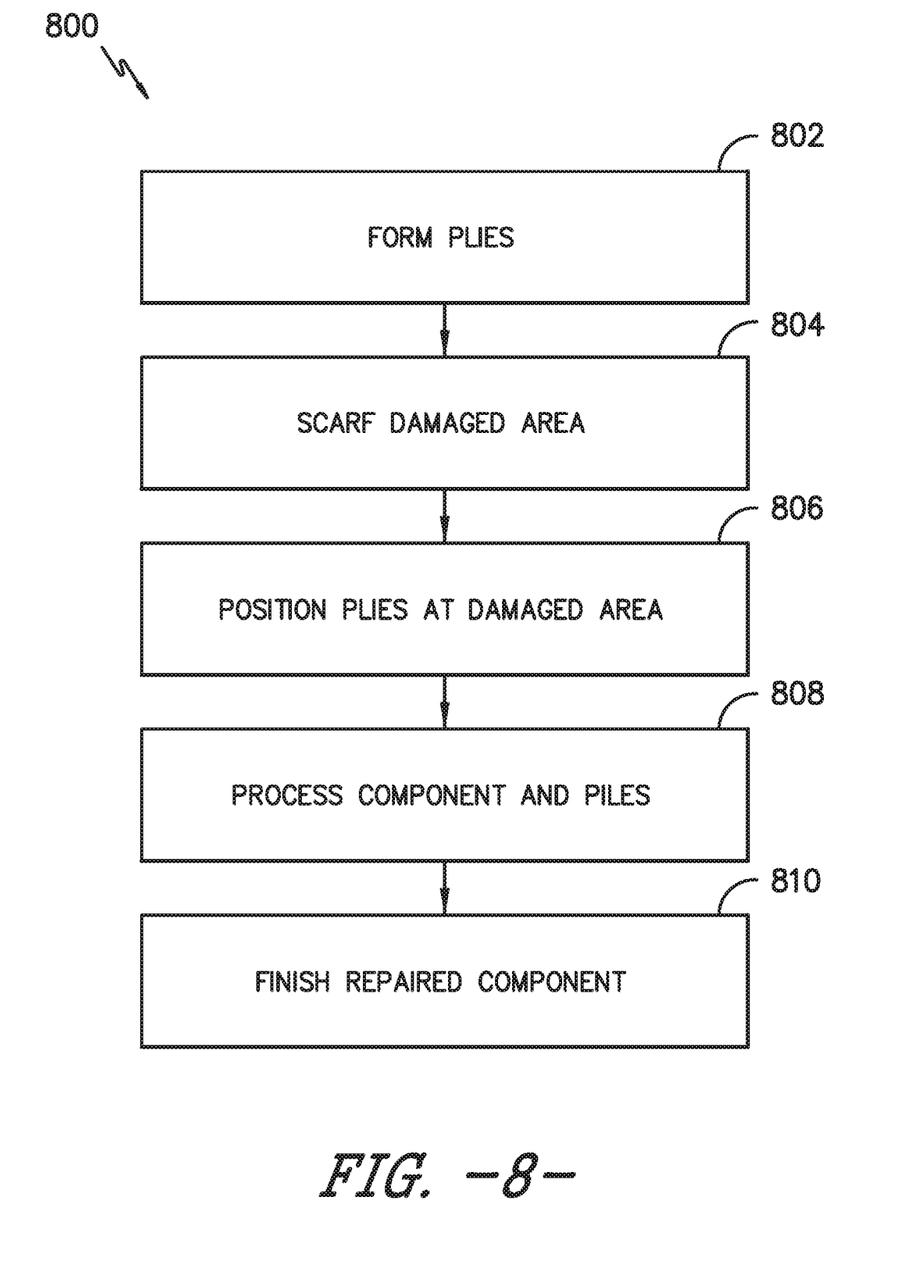
FIG. 8 provides a chart illustrating a method for repairing a ceramic matrix composite component according to an exemplary embodiment of the present subject matter.

FIG. 8 provides a flow diagram illustrating a method 800 for repairing a damaged area 102 of a CMC component 100 according to an exemplary embodiment of the present subject matter. As shown at 802 in FIG. 8, the method 800 comprises forming a plurality of unidirectional CMC plies 104. For example, as described above and generally illustrated in FIGS. 3A and 3B, the unidirectional CMC plies 104 may be made from a CMC tape comprising ceramic fiber tows 106 embedded within a matrix material 108, such as the matrix materials previously described. Substantially all of the tows 106 extend along the ply direction P such that the fibers within a given ply 104 substantially are unidirectional; hence, each CMC ply 104 may be referred to as a unidirectional CMC ply 104. It will be understood that one or more binders, solvents, and/or other materials also may be used in forming the CMC tape. Further, as previously discussed, the plurality of CMC plies 104 may be made from scraps, pieces, or remnants of CMC plies, e.g., scraps or pieces left over from forming one or more CMC components 100. In any event, each CMC ply 104 preferably comprises ceramic fibers substantially oriented along a single direction such that each CMC ply 104 is unidirectional.

As shown at 804 in FIG. 8, the method 700 also may include scarfing the damaged area 102 before applying a repair patch 110. More particularly, as described above, the damaged area 102 of the CMC component 100 may be scarfed, e.g., to clean matrix material and ceramic fibers from the damaged area and/or to otherwise prepare the area to receive CMC repair material. For example, the damaged area 102 may be scarfed by digging out or machining the resulting cavity 102 at a specific angle or to achieve a target aspect ratio for the damaged area. In other embodiments, the damaged area 102 may be scarfed by removing ceramic fibers protruding from or into the cavity and/or by removing loose matrix material from the cavity, but otherwise not enlarging the damaged area. In some embodiments, the damaged area 102 may not require scarfing, such that scarfing as shown at 804 in method 800 is omitted or skipped.

Whether the damaged area 102 is scarfed or not, to repair the area a plurality of CMC plies 104 are positioned at the damaged area 102, as shown at 806 in FIG. 8. The plurality of CMC plies 104 thereby form a CMC repair patch 110. As previously described with respect to FIGS. 4, 5, 6, 7A, and 7B, each ply 104 of the plurality of CMC plies 104 may be a unidirectional CMC ply 104 comprising ceramic fiber tows 106 that substantially are oriented along a single direction, such as the ply direction P of each ply 104. The plurality of unidirectional CMC plies may be positioned at the damaged area 102 of the CMC component 100 such that the unidirectional CMC plies 104 are oriented in a plurality of directions. For example, as illustrated in FIG. 4, the plurality of unidirectional CMC plies 104 may be randomly oriented with respect to the CMC component 100. Alternatively or additionally, as depicted in FIG. 5, the plurality of unidirectional CMC plies may be interwoven. In still other embodiments, as shown in FIG. 6, the plurality of unidirectional CMC plies may be oriented in a generally fan-shaped configuration. Further, as illustrated in FIGS. 7A and 7B, the plurality of unidirectional CMC plies 104 may be positioned at a damaged area 102 in or near a transition region 112 with the plies randomly oriented or with at least two plies oriented in different directions. Thus, as described and depicted with respect to the various exemplary embodiments, the plurality of unidirectional CMC plies 104 may be positioned at the damaged area 102 such that the tows 106 of the various plies 104 are oriented in a plurality of directions. By orienting the plurality of CMC plies 104 and thereby the ceramic fibers of the CMC repair patch 110 in a plurality of directions, the repaired CMC component 100 may be better able to withstand loads oriented along multidirectional load paths. That is, the variety of fiber angle orientations may help impart strength to the repaired section of the CMC component 100, e.g., by helping to control and/or avoid residual stresses in the CMC component 100 that could weaken the repaired area. As such, positioning the CMC plies 104 to form one or more of the exemplary CMC repair patches 110 depicted in FIGS. 4, 5, 6, 7A, and 7B may be particularly useful for CMC components 100 subject to multidirectional loads.

After the positioning the plurality of plies 104 at the damaged area 102, the CMC plies 104 and CMC component 100 may be processed as shown at 808 in FIG. 8, e.g., the plies and component may be compacted and cured in an autoclave before undergoing firing (or burn-off) and densification. In an exemplary embodiment of method 800, the CMC component 100 with a repair patch 110 formed from a plurality of CMC plies 104 is placed in a furnace with silicon to burn off any solvents used in forming the CMC plies 104, to decompose binders in the solvents, to convert a ceramic matrix precursor of the plies 104 into ceramic matrix material, and to bond the plies 104 to the CMC component 100. The silicon melts and infiltrates any porosity created with the matrix as a result of the decomposition of the binders during burn-off/firing; the melt infiltration with silicon densifies the repaired CMC component 100. In one embodiment, densification and firing may be conducted in a vacuum furnace or an inert atmosphere having an established atmosphere at temperatures above 1200° C. to allow silicon or another appropriate material or materials to melt-infiltrate into the component. However, densification may be performed using any known densification technique including, but not limited to, Silcomp, melt-infiltration (MI), chemical vapor infiltration (CVI), polymer infiltration and pyrolysis (PIP), and oxide/oxide processes.

Further, in some embodiments utilizing melt infiltration to densify the CMC material of the repair patch and component, boron or another appropriate material or combination of materials may be added to the infiltrating material. For instance, silicon may be used as the infiltrating material as described above, and boron may be added to the silicon to reduce the melting point of the silicon infiltrating material. Reducing the melting point of the silicon may help ensure the silicon flows into the repaired area before the densifying material used in originally forming the CMC component 100 melts and flows out of the component.

Moreover, as shown at 810 in FIG. 8, after firing and densification the repaired CMC component 100 may be finish machined, if and as needed. For example, more plies 104 than are needed to cover the damaged area 102 may be positioned at the damaged area and then the component 100 with repair patch 110 may be machined to bring the component 100 into tolerance and/or to define the component geometry. That is, to help hold the component geometry and/or tolerances, plies 104 of repair patch 110 may be "overadded" to the component 100 and then the component 100 may be machined to define a proper shape and/or proper dimensions. Additionally or alternatively, the repaired CMC component 100 may be coated with, e.g., an environmental barrier coating (EBC). Other post-processing may be performed as well.

Method 800 is provided by way of example only. For example, other processing cycles, e.g., utilizing other known methods or techniques for compacting, curing, and/or densifying CMC plies, may be used. Moreover, other orientations of unidirectional CMC plies 104 may be used to position the fibers of tows 106 of the plies 104 in a plurality of directions with respect to the CMC component.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. A repair assembly, comprising:
a cured ceramic matrix composite (CMC) component; and
a plurality of uncured CMC plies laid up on the cured CMC component, the plurality of uncured CMC plies including
a first uncured CMC ply defining a first ply direction, and
a second uncured CMC ply defining a second ply direction,
wherein fibers forming the first uncured CMC ply extend substantially along the first ply direction and fibers forming the second uncured CMC ply extend substantially along the second ply direction,
wherein the first uncured CMC ply and the second uncured CMC ply are oriented such that the first ply direction extends in a different direction than the second ply direction with respect to the cured CMC component,
wherein each ply of the plurality of uncured CMC plies comprises ceramic fiber tows embedded in a matrix material such that substantially all of the ceramic fiber tows are oriented along a single direction,
wherein the plurality of uncured CMC plies are oriented such that the ceramic fiber tows of the plurality of uncured CMC plies are oriented in a plurality of directions with respect to the cured CMC component,
wherein the plurality of uncured CMC plies are laid up on an outer surface of the cured CMC component,
wherein at least a portion of the first uncured CMC ply contacts the outer surface, and
wherein at least a portion of the second uncured CMC ply contacts the outer surface.

2. The repair assembly of claim 1, further comprising a third uncured CMC ply defining a third ply direction.

3. The repair assembly of claim 2, wherein the first, second, and third uncured CMC plies are randomly oriented with respect to the cured CMC component such that the first, second, and third ply directions extend in different directions with respect to the cured CMC component.

4. The repair assembly of claim 2, wherein the first, second, and third uncured CMC plies overlap and are offset along a generally arcuate path.

5. The repair assembly of claim 1, wherein the plurality of uncured CMC plies comprises a plurality of first uncured CMC plies and a plurality of second uncured CMC plies, wherein the plurality of first uncured CMC plies is interwoven with the plurality of second uncured CMC plies.

6. The repair assembly of claim 1, wherein each ply of the plurality of uncured CMC plies comprises ceramic fiber tows embedded in a matrix material, each ply of the plurality of uncured CMC plies having a width of at least three ceramic fiber tows and a length that is at least four times the width of the ply.

* * * * *